United States Patent [19]

Dohogne et al.

[11] Patent Number: 5,475,275
[45] Date of Patent: Dec. 12, 1995

[54] MOTOR ASSEMBLIES WITH IMPROVED ENDSHIELDS

[75] Inventors: L. Ranney Dohogne, Creve Coeur; William J. Schnyder, Kirkwood; Douglas C. Debrecht, St. Charles, all of Mo.; Philip S. Johnson, Granite City, Ill.

[73] Assignee: Emerson Electric Co., St. Louis, Mo.

[21] Appl. No.: 194,531

[22] Filed: Feb. 10, 1994

[51] Int. Cl.$^6$ ........................................................ H02K 5/00
[52] U.S. Cl. ........................... 310/89; 310/42; 310/90; 310/91; 310/258; 248/674; 248/675; 384/441
[58] Field of Search ............................ 310/89, 62, 90, 310/63, 91, 85, 258, 42; 248/674, 675; 174/50; 384/441

[56] References Cited

U.S. PATENT DOCUMENTS

| | | | |
|---|---|---|---|
| 3,343,013 | 9/1967 | Wightman et al. | 310/43 |
| 3,489,934 | 1/1970 | Lewis | 310/43 |
| 3,714,705 | 2/1973 | Lewis | 29/596 |
| 3,782,669 | 1/1974 | Lewis | 248/14 |
| 3,900,234 | 8/1975 | Roddy | 310/90 |
| 4,110,644 | 8/1978 | Roddy et al. | 310/91 |
| 4,170,057 | 10/1979 | Roddy et al. | 29/596 |
| 4,219,245 | 8/1980 | Lewis | 308/29 |
| 4,245,870 | 1/1981 | Punshon | 308/36 |
| 4,306,168 | 12/1981 | Peachee | 310/217 |
| 4,319,150 | 3/1983 | Roddy et al. | 310/89 |
| 4,384,224 | 5/1983 | Spitler | 310/91 |
| 4,385,220 | 5/1983 | Bischoff | 200/293 |
| 4,689,507 | 8/1987 | Baker et al. | 310/62 |
| 4,757,221 | 7/1988 | Kurihashi | 310/89 |
| 4,777,221 | 10/1988 | Taylor | 310/90 |
| 4,801,831 | 1/1989 | Lewis | 310/91 |
| 4,914,331 | 4/1990 | Lewis | 310/90 |
| 4,992,151 | 5/1990 | Lewis | 310/91 |
| 4,992,690 | 2/1991 | Baker | 310/89 |
| 5,019,735 | 5/1991 | Lee | 310/89 |
| 5,278,469 | 1/1994 | Weber et al. | 310/89 |

FOREIGN PATENT DOCUMENTS

| | | | |
|---|---|---|---|
| 463001 | 2/1970 | Canada | 310/89 |
| 4123785 | 1/1993 | Germany | 310/91 |

*Primary Examiner*—R. Skudy
*Attorney, Agent, or Firm*—Polster, Lieder, Woodruff & Lucchesi

[57] ABSTRACT

A motor assembly includes a stator assembly and a rotor assembly having an associated rotor shaft. The rotor shaft is mounted between and supported by endshields both are mounted to the stator assembly. At least the mounting one of the endshields includes a plurality of truss members so configured as to permit the endshield to be made of different materials while retaining substantially the same configuration. The truss members include rails oriented generally parallel to the axis of rotation of the rotor shaft. A web extends between the rails. Knee beam truss members are braced in various configurations. In some embodiments, a venturi cowling is provided to cause air to flow over end turns of the motor.

5 Claims, 10 Drawing Sheets

MOTOR ASSEMBLIES WITH IMPROVED ENDSHIELDS

CROSS REFERENCE TO RELATED APPLICATION

This application is related to a co-pending application of L. Ranney Dohogne, Robbie F. Johnson, and Michael J. Rosenfeld, Ser. No. 08/194,885, filed Feb. 14, 1994, and assigned to a common assignee.

BACKGROUND OF THE INVENTION

Both the manufacturers of appliances and other equipment applications involving high volume unit production, such as furnace fans, blowers for air conditioners, washing machines, dryers, and the like, and manufacturers of motors used in such applications keep trying to reduce the cost of their products. One way to reduce the cost of the motors is to make them lighter, or to make their endshields of material that is, at the time of their manufacture, particularly inexpensive. The cost of materials varies: at one time, aluminum may be the least expensive, while at another, fiber reinforced plastic may be. It is desirable to have an endshield construction that permits use of the least expensive satisfactory material. Single phase induction motors having at least one main winding and a start winding of the resistance start split phase type conventionally have been used in these sorts of applications, because of the economy inherent in their manufacture. While the invention disclosed hereinafter works well with and is described as applied to single phase induction motors, its applicability is not restricted to them.

Conventionally, a single phase induction motor has oppositely disposed endshields mounted on radially flat surfaces of a stator assembly. The stator assembly includes a single phase main winding and a start winding arranged in slots in a laminated iron stator core. A rotor has a shaft journaled in suitably lubricated bearings carried by the endshields. Although the endshields can be attached to the stator assembly in a variety of ways, in the endshield design of this invention illustrated and described, the two endshields have four legs which project into channels or grooves in truncated corners of the stator core. The legs are then secured in place with epoxy injected into the joints between the legs and the walls of the channels. Such constructions are described in U.S. Pat. Nos. 3,343,013 and 4,110,644.

It is known to provide aluminum endshields of a skeleton frame construction rather than a full enclosure, because the motor is located inside an appliance. Present skeleton endshields weigh approximately 1.5 pounds and use 15.7 cubic inches of aluminum in finished form. The structural characteristics of the skeleton design are considered adequate, as established by a long history of successful market application. However, prior attempts to reduce the amount of material in the endshield design has resulted in performance problems. In the past, the cost of aluminum has fluctuated dramatically, and there are and have been a number of attempts made either to reduce the amount of material in the endshields or to find substitute lower cost materials.

Although a completely skeletal endshield of the type illustrated in co-pending application, Ser. No. 08/194,885, accomplishes the objects of reducing the amount of material and providing a structure with a configuration adapted to be used with different materials, there are other considerations that have not been addressed by that application. In some equipment, the skeletal configuration may not have sufficient resistance to deflection. In others, the open construction may not permit the motor to reach an optimum operating temperature, although as is noted in that application, thin webs of material can be employed to reduce the amount of cooling, or, conversely, the air flow pattern may not produce enough controlled flow to cool the windings adequately.

One of the objects of this invention is to provide endshields of a configuration that is adapted to be used in producing endshields of different materials.

Another object is to provide such an endshield which is structurally sound and capable of resisting deflection under severe conditions.

Another object is to provide such an endshield which produces a controlled flow of air over the end turns of the stator winding.

Another object is to provide such an endshield which is economical to produce.

Other objects will become apparent to those skilled in the art in the light of the following description and accompanying drawings.

SUMMARY OF THE INVENTION

In accordance with this invention, generally stated, a motor assembly is provided that includes a conventional stator core and windings (not shown) and a rotor including a rotor shaft (not shown). In the illustrative embodiments described, the motor assembly includes a mounting endshield and a switch endshield. At least the mounting endshield is of unconventional configuration. The rotor shaft is journaled in the endshields for rotation. The mounting endshield includes a plurality of truss members which comprise rails oriented generally parallel to the axis of rotation of the rotor shaft. A bearing assembly mounting ring in the mounting endshield is supported by a plurality of truss members in the form of spokes. A bearing assembly is mounted in the bearing assembly mounting ring. The rotor shaft is journaled in the bearing assembly. In referring to the orientation of various elements of the end shield, the expressions "radially outwardly" and "radially inwardly" are used to mean in a direction away from or toward the axis of rotation of the rotor shaft, generally perpendicularly to the axis, and the expressions "axially outwardly" and "axially inwardly" are used to mean in a direction, generally parallel to the axis, away from or toward end faces of the stator core.

In the mounting endshield of all of the illustrative embodiments, as has been indicated, the spokes supporting the bearing assembly mounting ring take the form of beams with rails oriented generally parallel to the axis of rotation of the rotor shaft, joined by a web.

In each of the embodiments, an outer frame is provided from which legs project into channels in truncated corners of the stator core. Also in each of the illustrative embodiments shown, the outer frame is defined in part by knee beams, from radially outer ends of which the legs extend.

In each of the embodiments described hereinafter, the knee beams are braced. In one embodiment, the braces comprise hoop beams connected at one end to the knee beams at the junctures of the knee beams and legs, and at another end, to a frame to which the spokes supporting the bearing assembly mounting ring are connected. In other embodiments, the braces take the form of triangular gussets. In still another embodiment, an inner, generally circular frame is provided spaced from and concentric with the bearing assembly mounting ring, and an outer frame is provided, with a web, defining a cowling, extending between them. The web can be planar, but is preferably toroidally arcuate, extending radially above fan blades carried by the rotor and across end turns of stator windings, whereby a venturi effect causes the passage of air under the cowling and over the end turns, when the rotor, hence the rotor blades, rotates.

DRAWINGS

In the drawing, FIG. 1 is a view in top perspective of one illustrative embodiment of endshield of this invention;

DESCRIPTION OF THE PREFERRED EMBODIMENT

Figure 1:
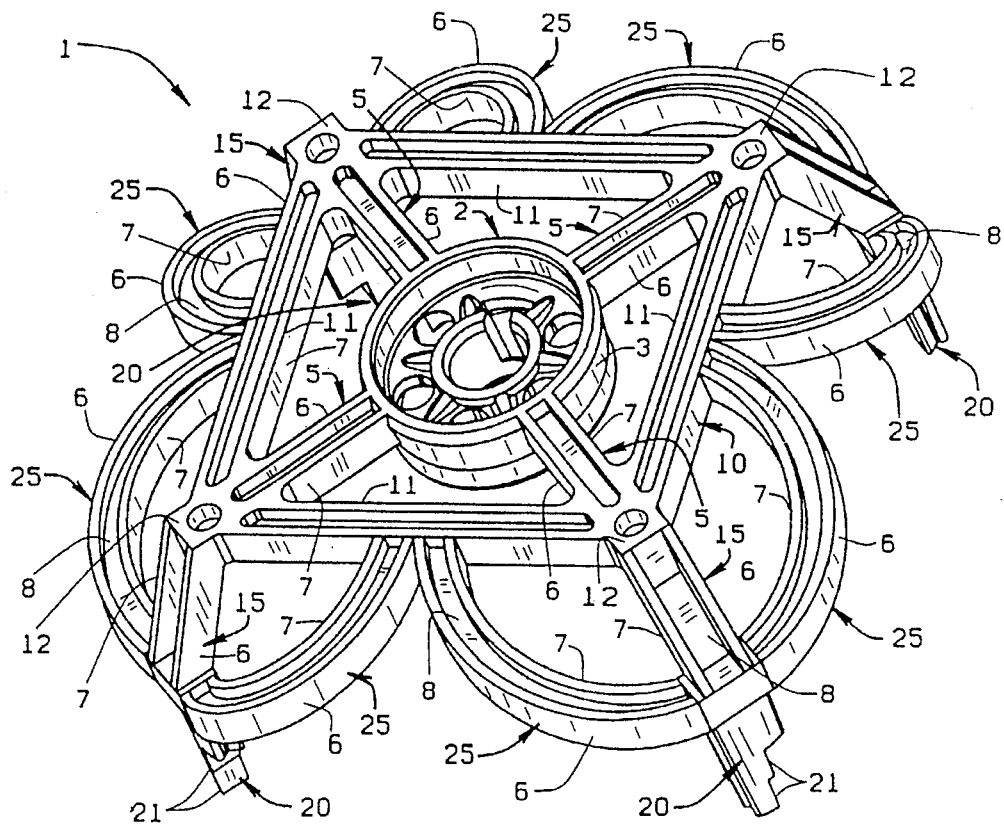
Figure 2:
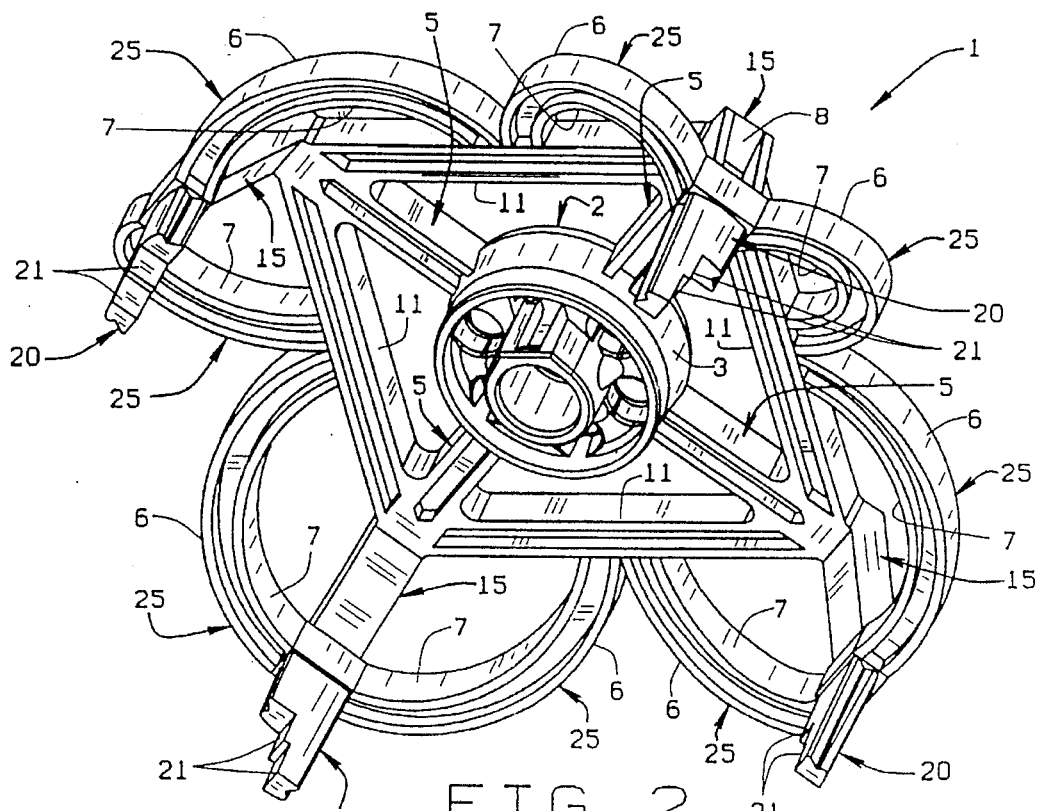
FIG. 2 is a view in bottom perspective of the endshield shown in FIG. 1.
Figure 3:
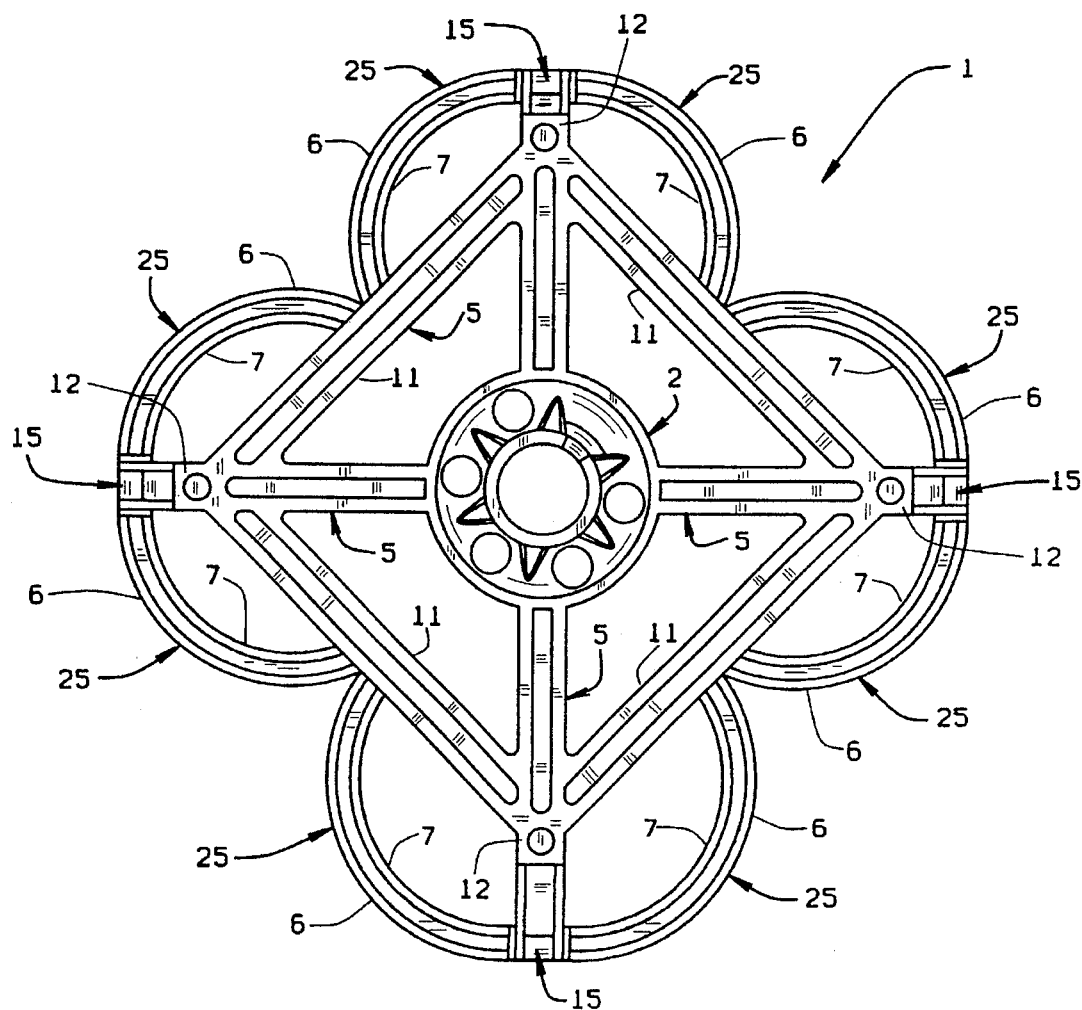
FIG. 3 is a top plan view of the endshield shown in FIGS. 1 and 2.
Figure 4:
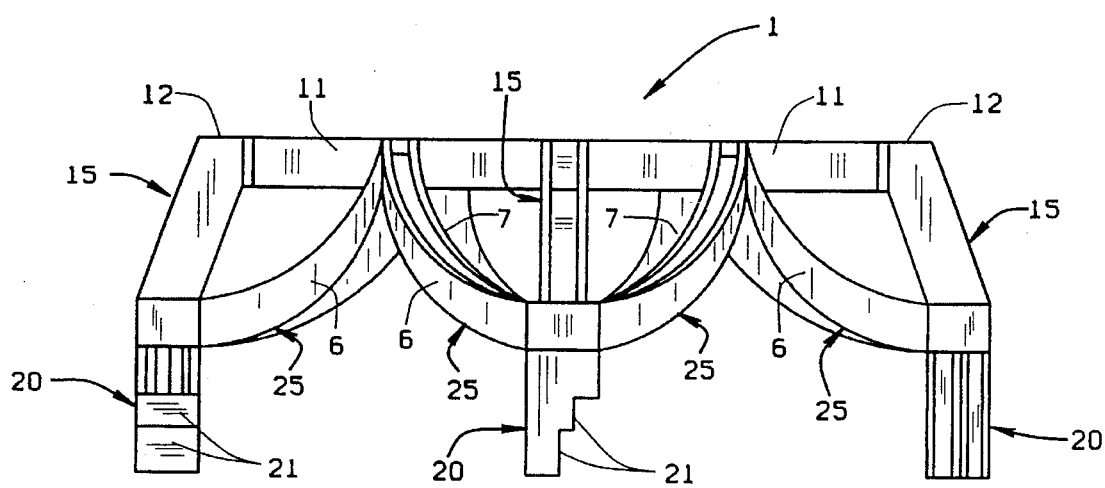
FIG. 4 is a view in side elevation of the endshield shown in FIGS. 1 through 3.
Figure 5:
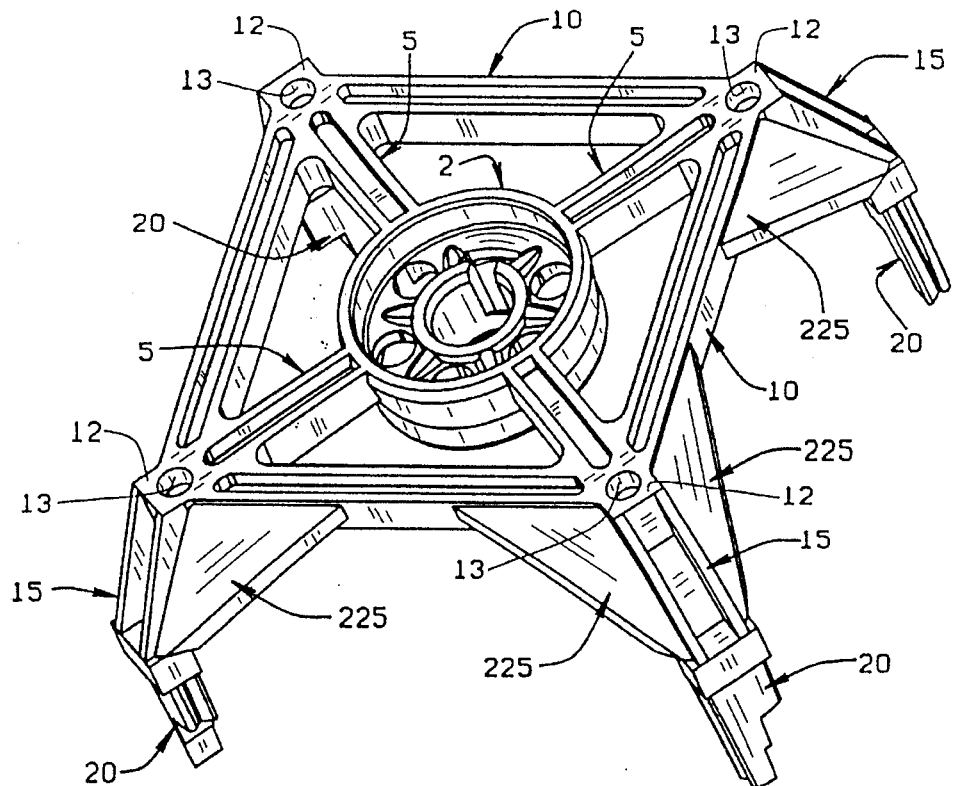
FIG. 5 is a view in top perspective of a second embodiment of endshield of this invention.
Figure 6:
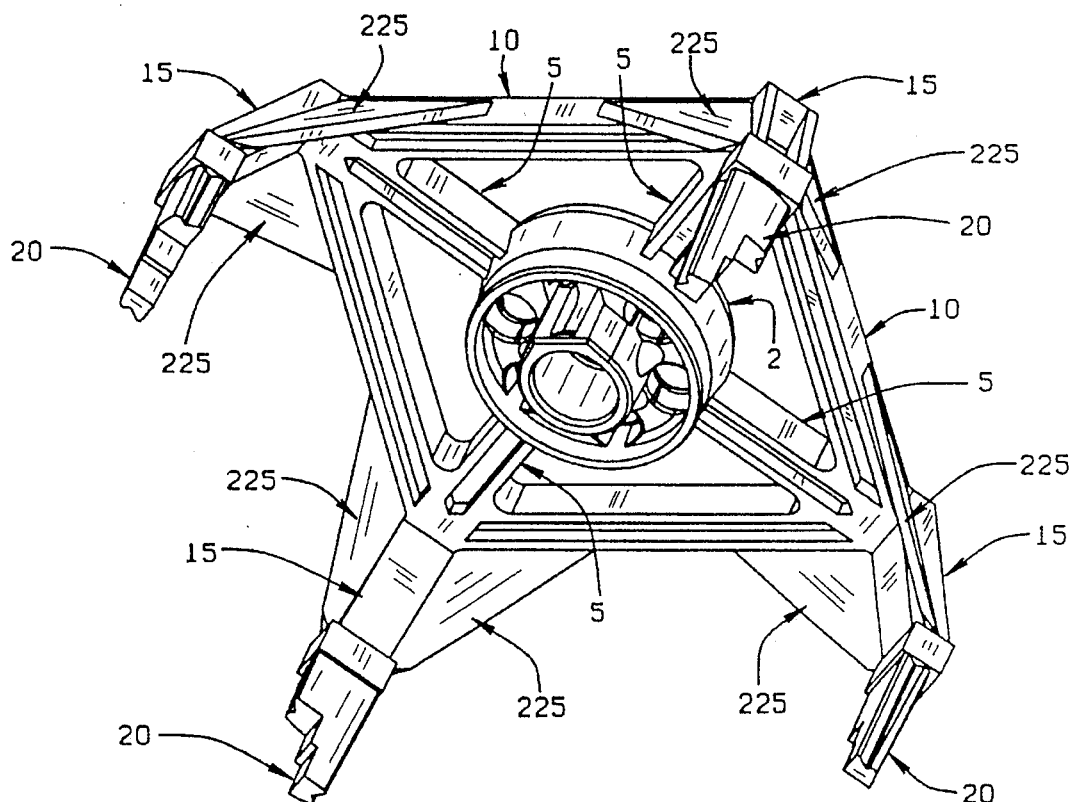
FIG. 6 is a bottom perspective view of the endshield of FIG. 5.
Figure 7:
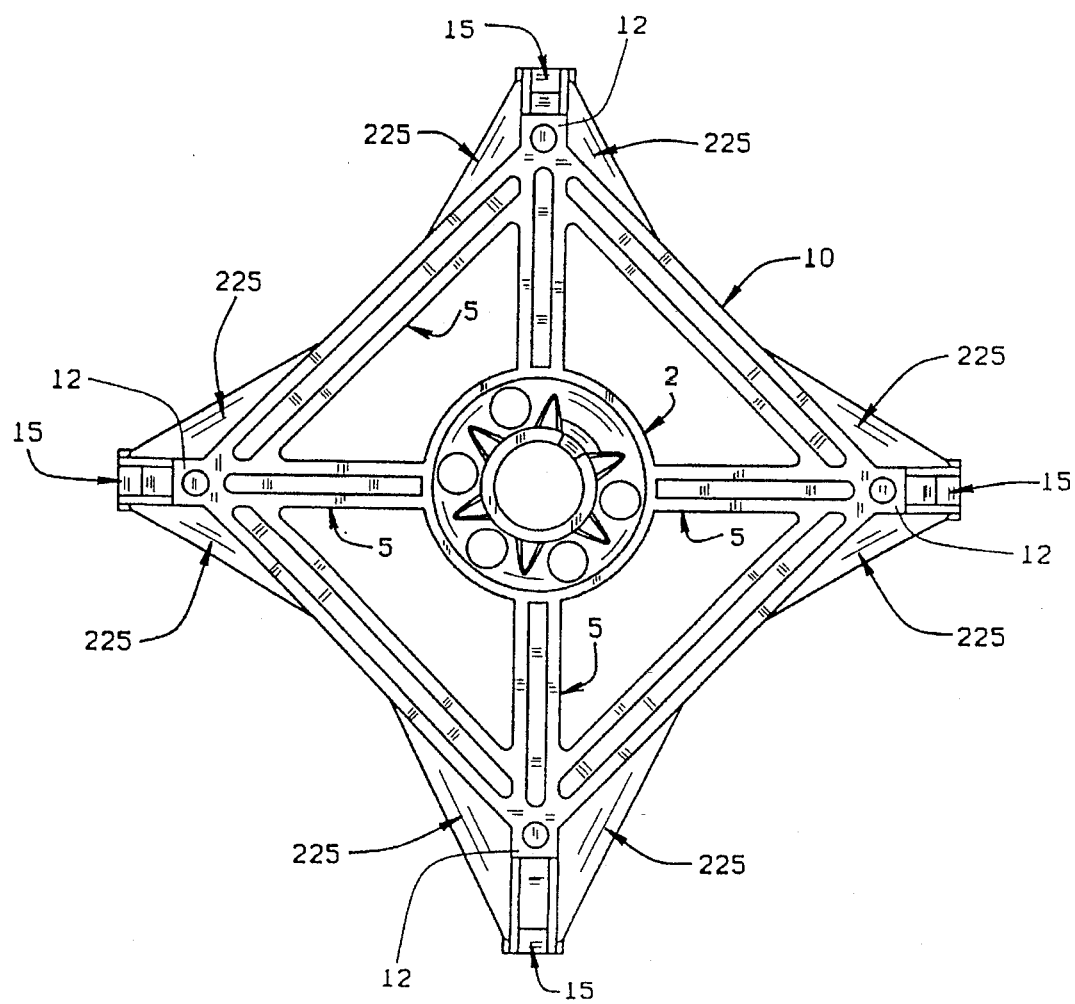
FIG. 7 is a top plan view of the endshield shown in FIGS. 5 and 6.
Figure 8:
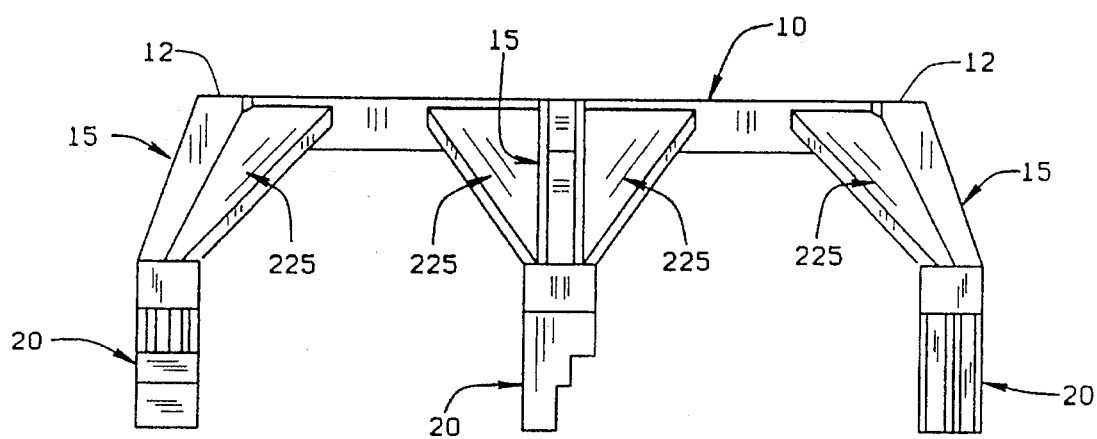
FIG. 8 is a view in side elevation of the endshield shown in FIGS. 5 through 7.
Figure 9:
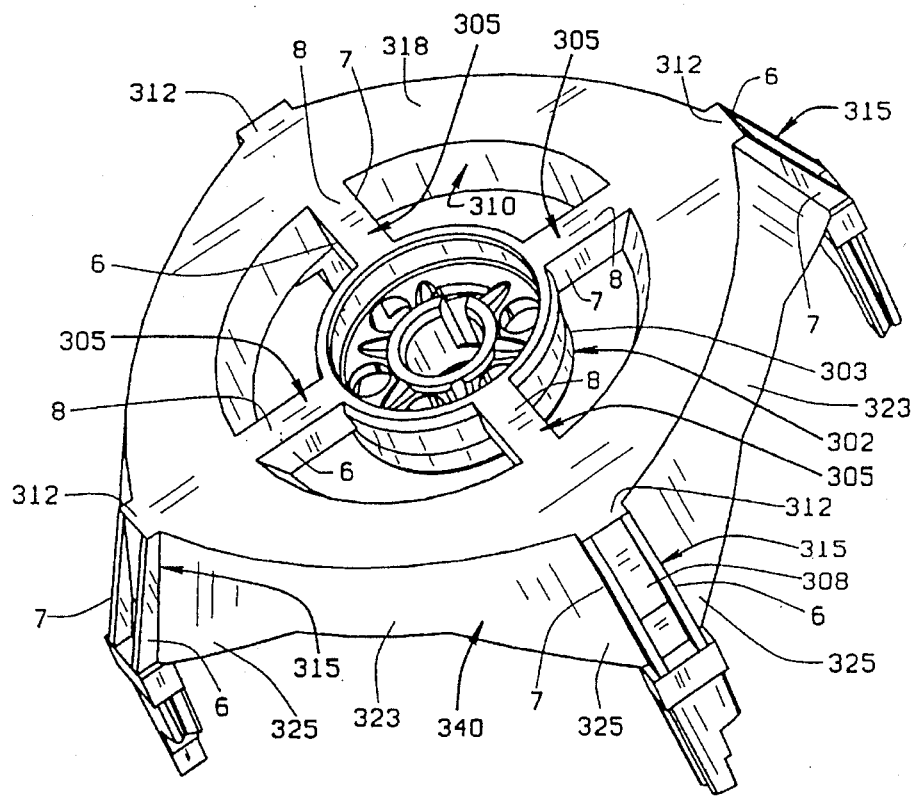
FIG. 9 is a view in top perspective of a third embodiment of endshield of this invention.
Figure 10:
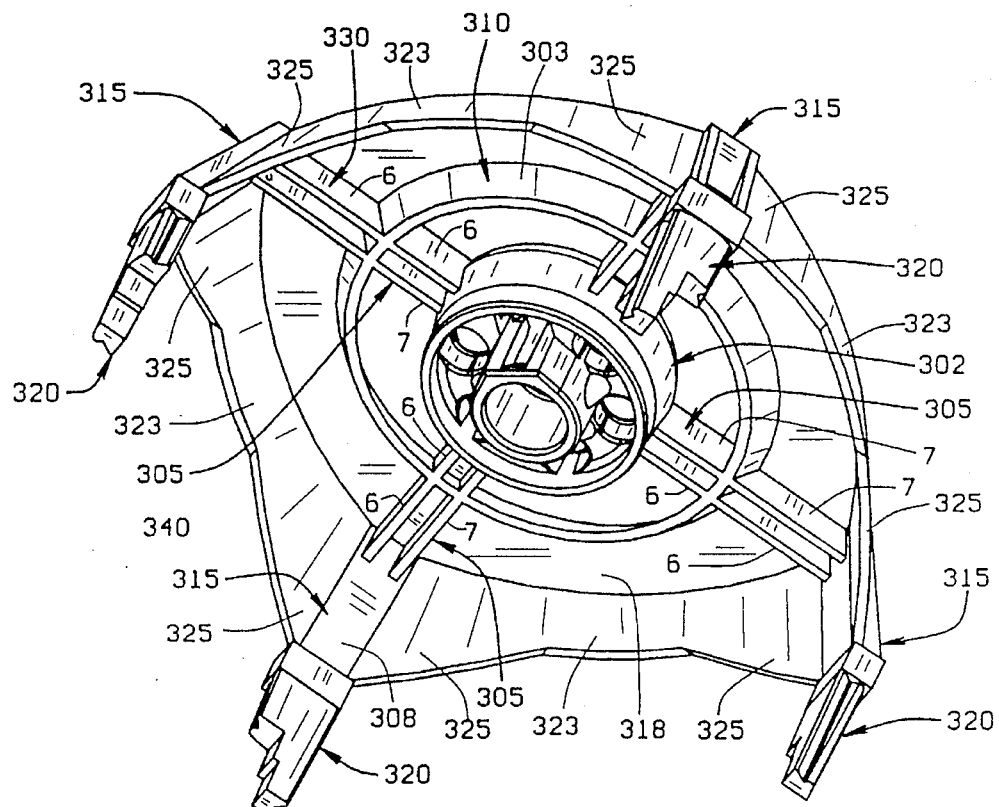
FIG. 10 is a view in bottom perspective of the endshield shown in FIG. 9.
Figure 11:
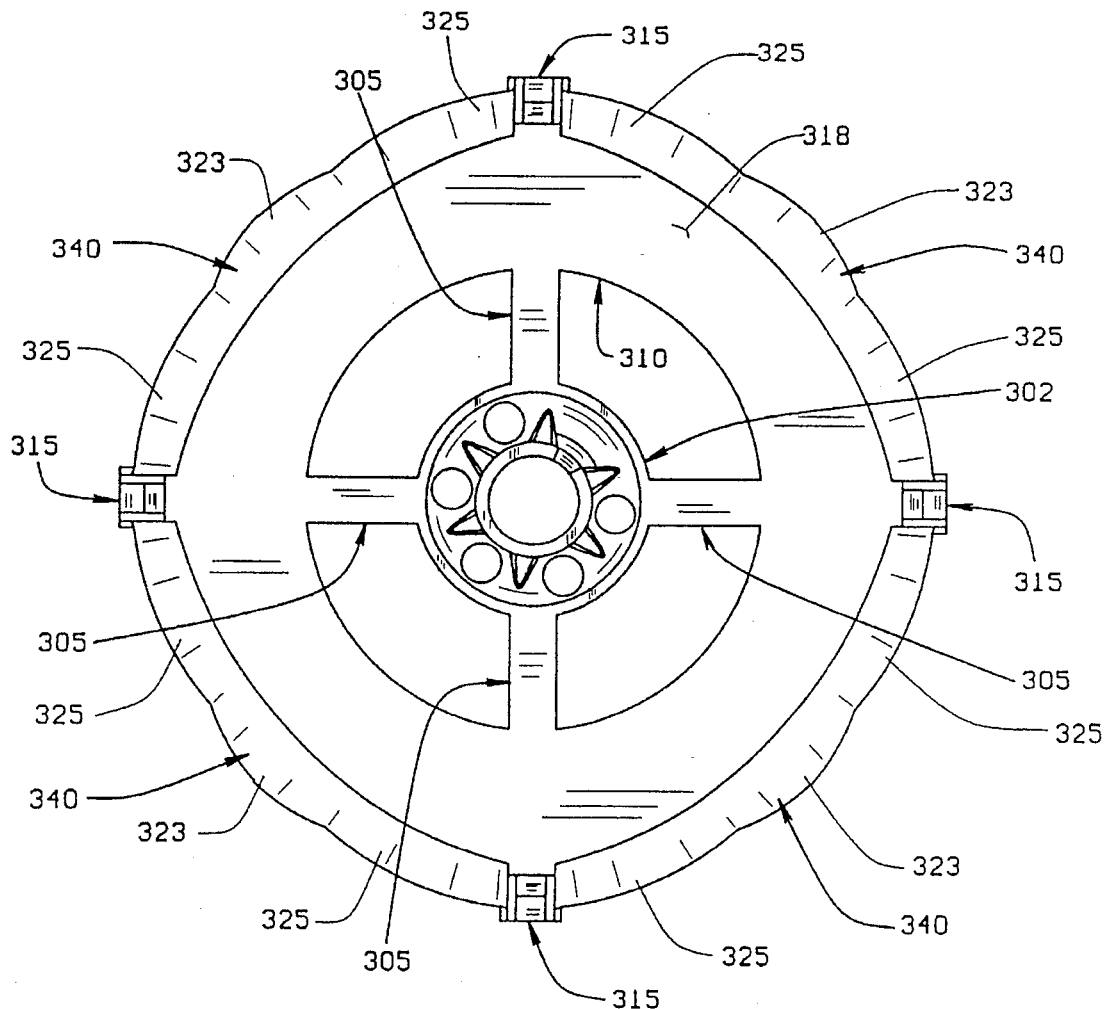
FIG. 11 is a top plan view of the endshield shown in FIGS. 9 and 10.
Figure 12:
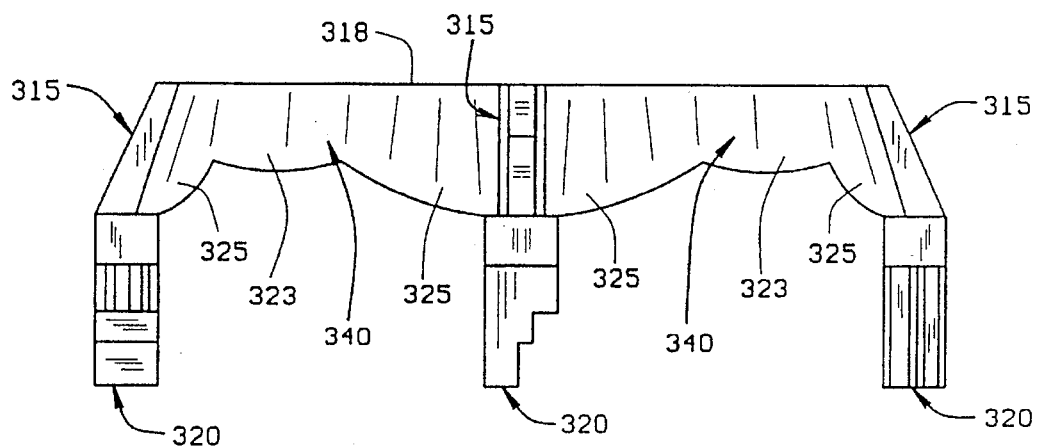
FIG. 12 is a view in side elevation of the endshield shown in FIGS. 9 through 11.
Figure 19:
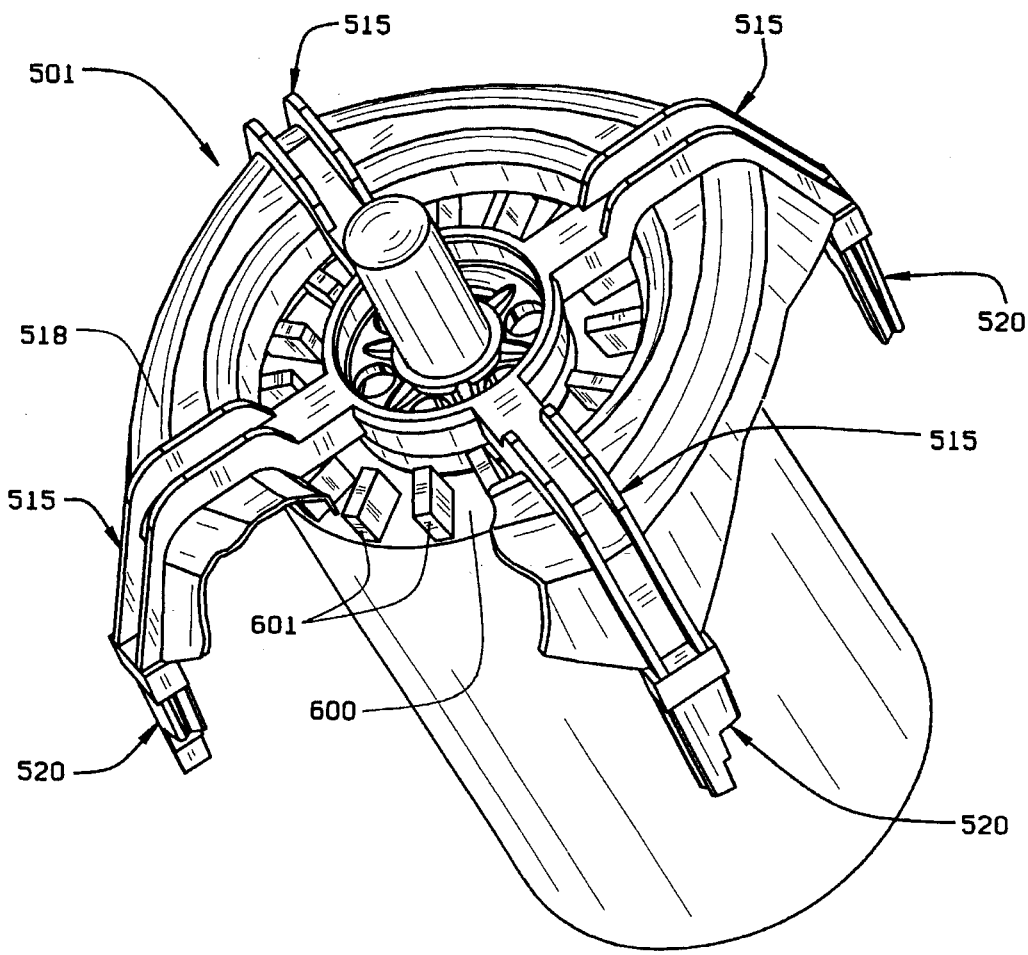
FIG. 19 is a fragmentary view in top perspective of a motor with the embodiment of endshield shown in FIGS. 15 through 18.
Figure 20:
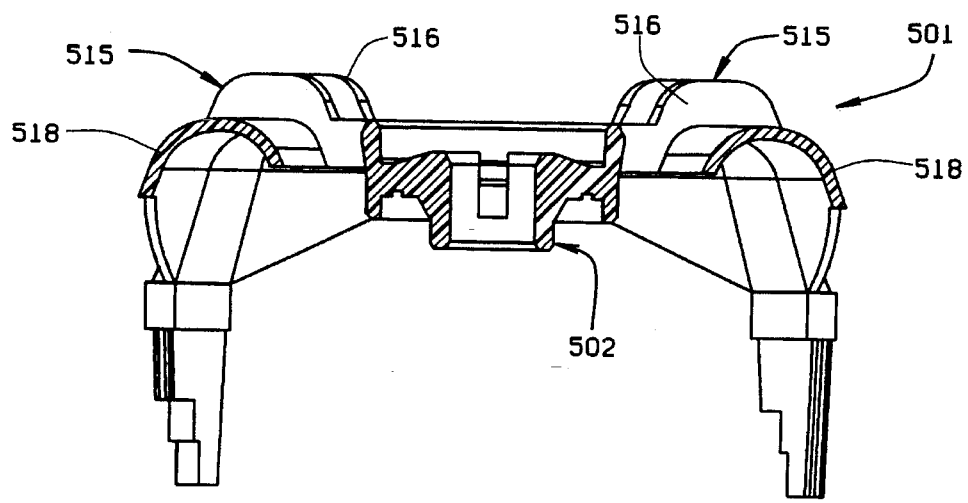
FIG. 20 is a sectional view taken along the line 20—20 of FIG. 17.

Referring now to the drawings for illustrative embodiments of this invention, and particularly to FIGS. 1–4, reference numeral I indicates a mounting endshield adapted to be fastened to an appliance or the like. A second, switch endshield, mounted on a stator assembly, is at an end of the stator assembly remote from the appliance. The second endshield may generally resemble the mounting endshield, but is modified to permit the mounting of switch and electrical connection means. Such an endshield is shown in FIGS. 9 through 14 of application Ser. No. 08/194,885. Alternatively, the switch endshield can be made conventionally. The endshields are attached to an outside surface of a wound stator as illustrated in FIGS. 1 and 2 of application Ser. No. 08/194,885, and carry a bearing assembly in which a rotor is mounted for rotation about a central axis of rotation, as also illustrated in FIGS. 1 and 2 of Ser. No. 08/194,885, and in FIG. 19 of the present application. The stator and rotor construction are conventional. As illustrated in FIG. 19 of the present application, the rotor is provided with fan blades.

The endshield 1 has at its center a bearing assembly mounting ring 2, which is configured and constructed so as to receive and mount a conventional bearing assembly, not here shown. The bearing assembly mounting ring 2 includes a cylindrical wall 3, from which spokes 5 extend to inner corners of a square outer frame 10. Knee beams 15 extend radially outwardly and axially inwardly in a direction toward the stator to which the endshield 1 is mounted. Legs 20 extend from the radially outer ends of the beams 15, in a direction substantially parallel to the center axis of the ring 2, which is the axis of rotation of a stator shaft journaled in the bearing assembly mounted in the ring 2. The free ends of the legs 20 are stepped, as shown at 21. The legs of the switch endshield are stepped complementarily, and the legs are of a length such as to permit the stepped portions of the legs 20 of the two endshields to meet, to provide both support and additional surface to which epoxy may adhere.

The frame 10 is made up of four beams 11, meeting at their ends in bosses 12 from which the knee beams 15 extend. In the embodiment shown, fastener passages 13 are provided, extending axially through the bosses 12, to accommodate fastening means by which the endshield is attached to the appliance or apparatus with which it is to be used. Alternatively, mounting pins, with a cylindrical lower section and a truncated conical axially outer section, such as those illustrated in FIGS. 1 through 7 of application Ser. No. 08/194,885, can be provided.

The entire endshield, frame members, hoops, spokes, bearing assembly mounting ring, knee beams, and legs, is made in one piece.

In this embodiment, hoops, in the form of arcuate beams 25 are each at one end integral with a knee beam at its juncture with a leg, and at another end, with a central portion of a radially outer side of a beam 11.

Each of the spokes 5, beams 11, knee beams 15, and hoops 25 is made up of rails 6 and 7, with a web 8 between them.

One advantage of the structure of this embodiment over the conventional box-like structure, is that it provides greater winding clearance, and moves the material outside of the winding envelope.

Referring now to FIGS. 5–8 for another embodiment of this invention, the bearing assembly mounting ring 2, spokes 5, outer frame 10, bosses 12, knee beams 15, and legs 20 are all identical to those shown in FIGS. 1–4. The difference between the embodiment shown in FIGS. 1–4 and that of FIGS. 5–8, is in the provision of triangular gussets 225 that extend from an outside axial surface of the beams making up the frame 10, along the knee beams 15, to a point at the juncture of the knee beam and the leg 20. As in the embodiment shown in FIG. 1, the entire endshield is made in one piece. The advantage of the gussets 225 is that they provide rigidity and strength to the structure, but eliminate a trimming problem that may be encountered with the hoop beams.

Referring now to FIGS. 9–12 for another embodiment of this invention, reference numeral 301 indicates an endshield, with a central bearing assembly mounting ring 302 that can be identical with the mounting ring 2 of the embodiment shown in FIGS. 1–8, and spokes 305 extending radially outwardly from a side wall 303 of the ring 302 to a frame 310. In this embodiment, the frame 310 is substantially circular in plan and concentric with the axis of the bearing assembly, hence the rotor shaft. Spoke extension beams or truss members 330 are aligned with the spokes 305, are integral with a radially outer surface of the circular frame 310, and are integral at their radially outer ends with a web 308 of knee beams 315, at a boss 312. As in the endshields of the previous embodiments, legs 320 project from an axially inward radially outward end of the knee beams 315.

In this embodiment, as in the embodiments previously described, the beams 330, spokes 305, and knee beams 315 comprise rails 6 and 7, oriented generally parallel with the axis of rotation of a rotor shaft extending through a bearing assembly mounted in the bearing assembly mounting ring 302. The frame 310, also, is in the form of a rail 306, which, together with a circumferential wall or skirt 340, also constitutes a beam of sorts.

In this embodiment, spoke rails 6 and 7 have a web 8 extending between them at the axially outer edges of the rails. A web 318 forms a cowling, but also serves as a web between rails 6 and 7 of the extensions 330, and also as a web between the beam defined by the frame 310 and the wall 340.

The wall 340 is generally circular in plan along the surface of the web 318, and extends generally uniformly radially through a center section 323 between each of the knee beams 315. From the center section 323, the wall flares to form a gusset 325 along each of the knee beams 315 contiguous the wall.

In this embodiment, the circular frame 310 defines an open area, except for the spokes 315, through which air can pass. The cowling is radially over the blades 601 on the rotor 600, and spans the end turns of the stator winding (not shown) radially, but is spaced axially outwardly from the blades 601 and end turns (not shown). The central section 323 of the wall 340 is spaced axially outwardly from the stator core, to provide passageways for air drawn, by a venturi effect, from the area radially outside the endshield, across the end turns, and out the opening around the bearing assembly mounting ring.

This, third embodiment thus provides controlled air flow over the end wires, and the rigidity of the truss arrangement.

Figure 13:
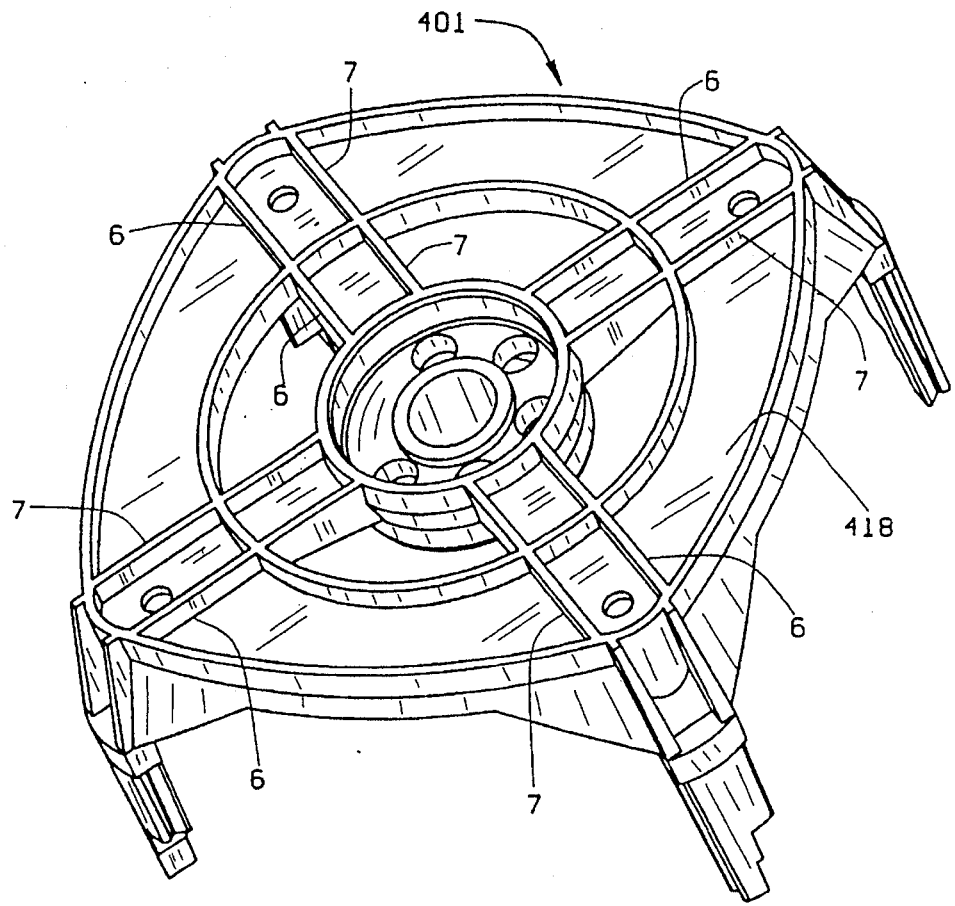
FIG. 13 is a view in top perspective of a fourth embodiment of endshield of this invention.
Figure 14:
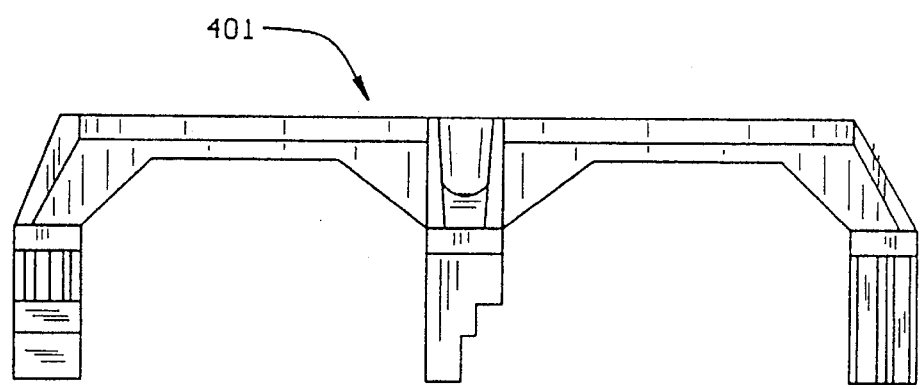
FIG. 14 is a view in side elevation of the endshield shown in FIG. 13.
Figure 15:
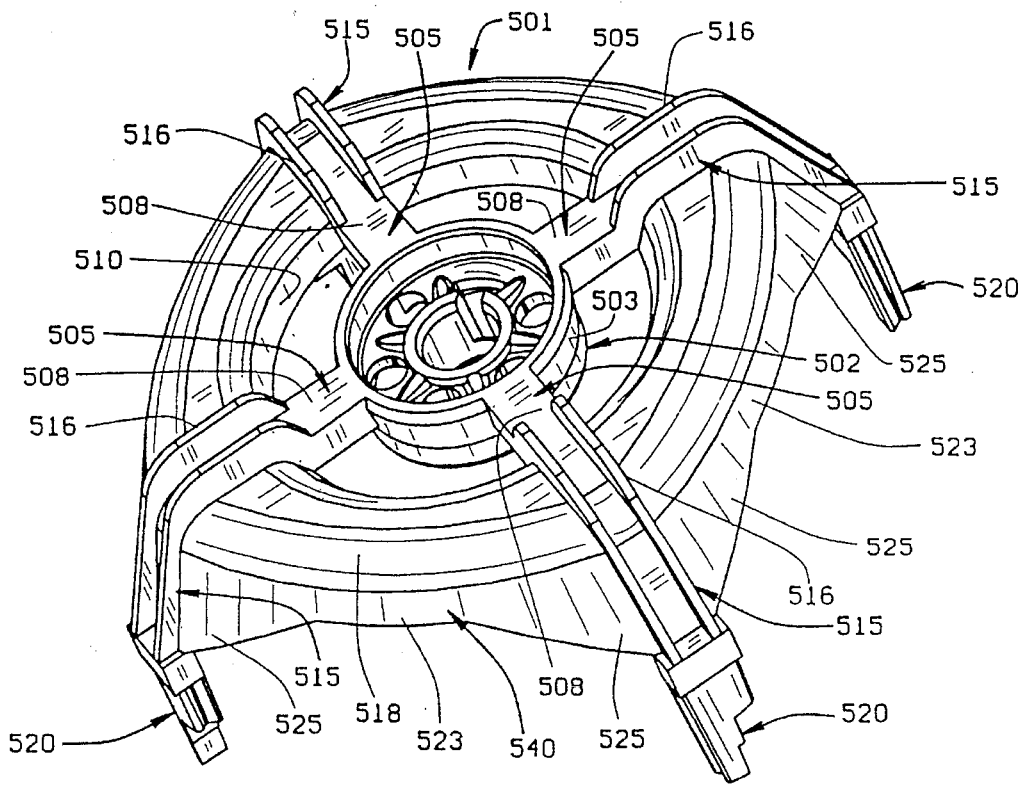
FIG. 15 is a view in top perspective of a fifth embodiment of endshield of this invention.
Figure 16:
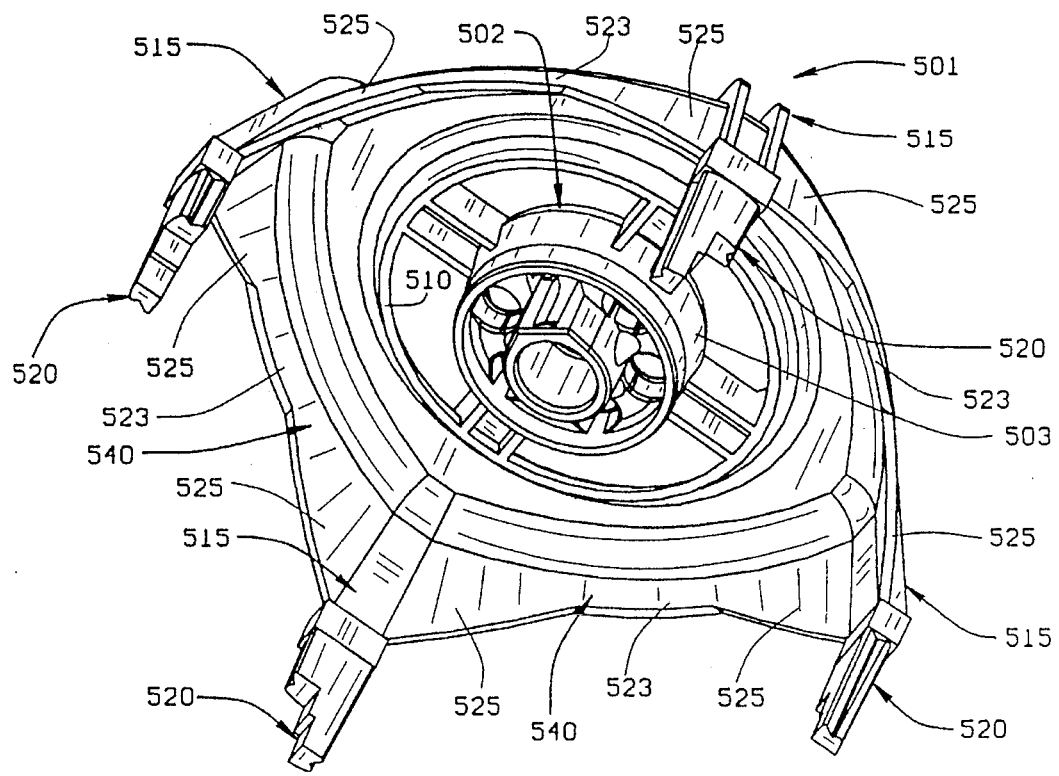
FIG. 16 is a view in bottom perspective of the endshield shown in FIG. 15.
Figure 17:
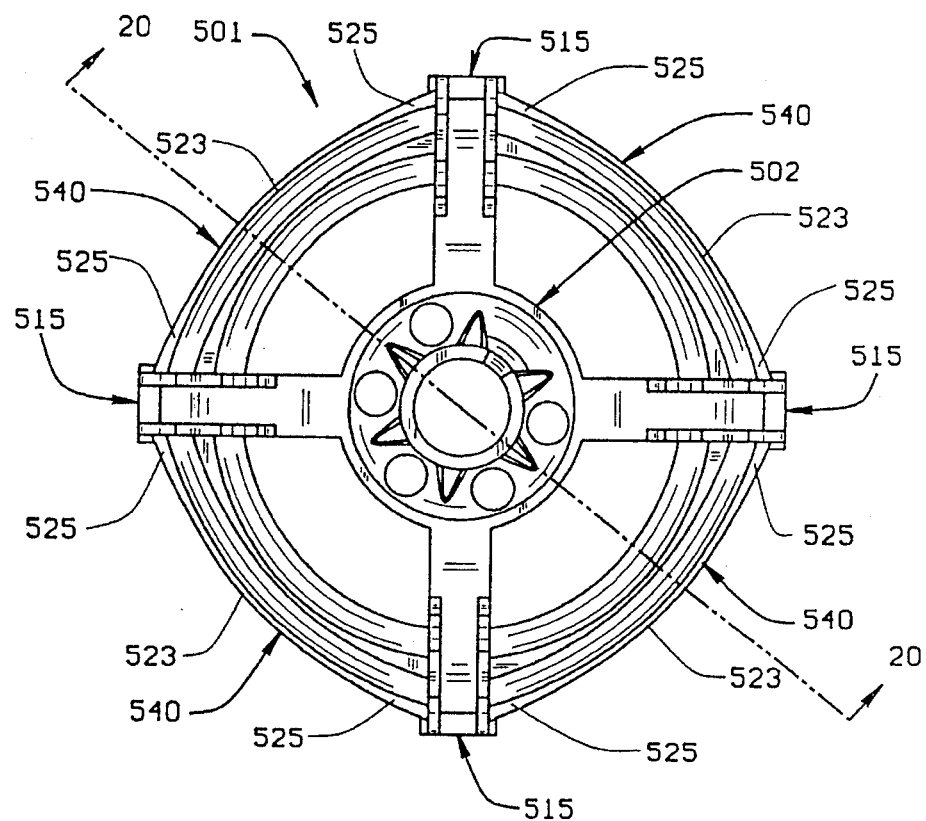
FIG. 17 is a top plan view of the endshield shown in FIGS. 15 and 16.
Figure 18:
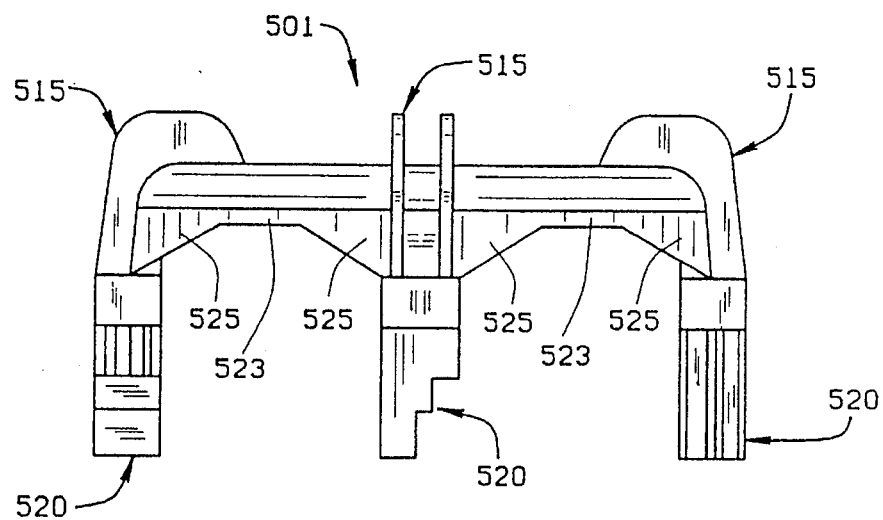
FIG. 18 is a view in side elevation of the endshields of FIGS. 15 through 17.

Referring now to FIGS. 13 and 14, in an endshield 401, webs 8 and 418 are not at edges of the rails 6 and 7 remote from the stator but in a position at which the webs are integral with the rails along edges nearest the stator core. A circular frame rail 406 forms with a peripheral rail 446 a beam with the web 418. The peripheral rail 446 is generally circular in plan, which provides "hoop" strength to the end shield. The arrangement of the elements of this embodiment provides a smooth, substantially uninterrupted path for the air moving over the end turns, and increases the strength of the beams with respect to the load application point in appliances to which the motor is connected.

Referring now to FIGS. 15–20 for yet another, and preferred embodiment, reference numeral 501 indicates a complete, one piece, endshield. Like the embodiments previously described, the endshield 501 has a bearing assembly mounting ring 502 with a cylindrical side wall 503, and radially extending spokes 505. In this embodiment, the radially outer ends of the spokes 505 are of a piece not only with knee beams 515 but with a substantially circular, axially extending frame section 510 which defines the inner edge of a web or cowling 518. In this embodiment, the cowling 518 is toroidal and axially outwardly arcuate in cross section, as shown particularly in FIG. 20. The knee beams 515 in this embodiment have an arch part 516, axially exterior of and of a piece with the cowling 518.

As in the other embodiments, the spokes 505 and knee beams 515 include rails 506 and 507 oriented substantially parallel with the axis of the rotor shaft. The spokes 505 have webs 508 along the axially outer edges of the rails. The rails 506 and 507 of the knee beams 515, including the arch part 516, utilize the cowling 518 as the web between the rails at their axially inner edges.

As is the case with the cowlings of FIGS. 9–14, the cowling 518 has at its radially outer edge a skirt portion 540 made up of a central section 523 between each of the knee beams 515, and gussets 525 extending from the center section 523 to and along the section of the knee beam immediately axially outwardly of legs 520. Again, as in the case of the embodiments shown in FIGS. 5 through 14, the gussets 525 flare radially outwardly from the center section 523 to conform to the radial outward flare of the knee beams, and extend axially inwardly from the center section 523 so as to provide air passages.

The cowling 518 arches over the end turns of the stator and extends radially inwardly over a radially outer edge of the upper surface of the blades of the rotor.

By having the radially inner edge of the cowling extend to and a short distance over the radially outer edge of the rotor blades, and the endshield cowling curving over and covering the stator winding end turns, the rotor blades force air over the end turns with a laminar flow, cooling them.

Numerous variations within the scope of the appended claims will occur to those skilled in the art in the light of the foregoing disclosure. Combinations of various elements of the embodiments described can be used. The thickness of the rails and of the web can be varied, to permit the use of different materials, without affecting the critical dimensions. Other means of securing the endshield to the stator can be employed, although the legs of the embodiments described have advantages of durability and ease of manufacture. These are merely illustrative.

We claim:

1. In a motor assembly including a mounting endshield, a wound stator mounted to said endshield, a rotor mounted for rotation with respect to said stator about an axis of rotation, and a shaft extending from said rotor and being journaled in said endshield for rotation with respect to said stator, the improvement comprising said endshield being a skeletal end shield comprising a plurality of truss members integral with one another and comprising rails with a web extending between and integral with said rails, said rails being parallel with one another and being oriented substantially parallel to the axis of rotation of said rotor shaft, said truss members forming a one piece outer frame surrounding a bearing assembly mounting ring connected to said frame by spokes extending outwardly from said bearing assembly mounting ring to said outer frame, said outer frame including knee beams, extending radially outwardly and axially inwardly, from which legs project axially in a direction toward said stator, and gussets between said knee beams and a radially outer rail of said outer frame, said outer rail being oriented generally parallel to the axis of rotation of said rotor shaft, all of said bearing assembly mounting ring, spokes, outer frame, knee beams, legs, and gussets being one piece.

2. The motor assembly of claim 1 wherein said outer frame includes a generally circular rail spaced radially inwardly of said radially outer rail of said outer frame and radially outwardly of the bearing assembly mounting ring and concentric with said bearing assembly mounting ring, and said web between the rails comprising said outer frame extending between and being integral with said generally circular rail and said radially outward rail.

3. The motor assembly of claim 2 wherein the stator has windings, end turns of which project axially from an end of said stator contiguous said endshield, and the rotor has fan blades connected to it on a circle concentric with and radially outward of said shaft, and the web between said generally circular rail and said outer frame outer rail extends radially over said rotor fan blades and entirely over said end turns, and is axially outwardly spaced therefrom.

4. The motor assembly of claim 3 wherein said web between said generally circular rail and said outer rail of said outer frame is arched toroidally over said winding end turns.

5. The motor assembly of claim 3 wherein the web that extends over the rotor blades and end turns extends along and is integral with edges of the rails closest to said stator, whereby the surface of said web adjacent the said end turns and rotor fan blades is smoothly uninterrupted.

* * * * *